US008883955B2

(12) United States Patent
Matsuba et al.

(10) Patent No.: US 8,883,955 B2
(45) Date of Patent: Nov. 11, 2014

(54) METHOD FOR PRODUCING POLYLACTIC ACID

(75) Inventors: Kenichiro Matsuba, Narashino (JP); Tsuyoshi Aoki, Suginami-ku (JP)

(73) Assignees: Toyo Engineering Corporation, Tokyo (JP); Masashino Chemical Laboratory, Ltd, Tokyo (JP)

( * ) Notice: Subject to any disclaimer, the term of this patent is extended or adjusted under 35 U.S.C. 154(b) by 0 days.

(21) Appl. No.: 13/379,168

(22) PCT Filed: Jun. 14, 2010

(86) PCT No.: PCT/JP2010/060052
§ 371 (c)(1),
(2), (4) Date: Dec. 19, 2011

(87) PCT Pub. No.: WO2010/147088
PCT Pub. Date: Dec. 23, 2010

(65) Prior Publication Data
US 2012/0101248 A1   Apr. 26, 2012

(30) Foreign Application Priority Data

Jun. 19, 2009   (JP) ................................ 2009-146825

(51) Int. Cl.
*C08G 63/08*   (2006.01)
*C08G 63/78*   (2006.01)
*B01J 19/18*   (2006.01)
*B01J 19/00*   (2006.01)

(52) U.S. Cl.
CPC ........... *C08G 63/785* (2013.01); *B01J 19/1818* (2013.01); *B01J 2219/0004* (2013.01); *C08G 63/08* (2013.01); *B01J 2219/00094* (2013.01); *B01J 2219/00085* (2013.01); *B01J 19/1862* (2013.01); *B01J 19/0066* (2013.01)
USPC ........... 528/324; 528/271; 528/403; 528/406; 528/408; 526/64; 526/65; 422/134; 422/135

(58) Field of Classification Search
CPC ... C08G 63/08; C08G 63/785; B01J 19/0066; B01J 19/1862; B01J 19/1818

USPC .............. 422/131, 134, 135, 138; 526/64, 65; 528/403, 406, 408, 354
See application file for complete search history.

(56) References Cited

U.S. PATENT DOCUMENTS 4,354,020 A   10/1982   Rotzoll et al.
5,136,017 A   8/1992   Kharas et al.
(Continued)

FOREIGN PATENT DOCUMENTS

DE   4412317 A1   10/1994
EP   2009040 A1   12/2008
(Continued)

OTHER PUBLICATIONS

English Language Abstract for JP-A-10-120772.
(Continued)

*Primary Examiner* — Frances Tischler
(74) *Attorney, Agent, or Firm* — Christopher Casieri

(57) ABSTRACT

PROBLEM
There is provided a method for producing polylactic acid, which is capable of obtaining polylactic acid at low cost, and having high molecular weight.
SOLUTION
A method for producing polylactic acid by polymerizing molten lactide using at least one reactor having plug flow characteristics with $\xi(\tau)$, calculated from the following FORMULA (1), of 0.3 or smaller:

$$\xi(\tau)=\int_0^\infty (E(\tau) \times ABS(1-\tau))d\tau \quad (1)$$

in the Formula (1), $E(\tau)$ is a residence time distribution function determined by impulse response by starch syrup having a viscosity of 3 Pa·s, and $\tau$ is ratio of elapsed time $\theta$ and mean residence time $\theta_0$.

12 Claims, 8 Drawing Sheets

(56) References Cited

U.S. PATENT DOCUMENTS

| | | | |
|---|---|---|---|
| 6,716,935 B1 * | 4/2004 | Nelson et al. | 526/64 |
| 2005/0169817 A1 * | 8/2005 | Matsuo et al. | 422/135 |
| 2009/0111954 A1 | 4/2009 | Matsuo et al. | |
| 2010/0261838 A1 | 10/2010 | Hagen et al. | |

FOREIGN PATENT DOCUMENTS

| | | |
|---|---|---|
| EP | 2030679 A1 | 3/2009 |
| EP | 2055730 A2 | 5/2009 |
| GB | 2277324 A | 10/1994 |
| JP | A-8-283392 | 10/1996 |
| JP | A-10-060101 | 3/1998 |
| JP | A-10-120772 | 5/1998 |
| JP | A-10-130256 | 5/1998 |
| JP | A-2005-314503 | 11/2005 |
| JP | A-5-093050 | 11/2006 |
| JP | A-2009-132857 | 6/2009 |
| WO | 0158962 A1 | 8/2001 |
| WO | 2010012770 A1 | 2/2010 |

OTHER PUBLICATIONS

English Language Abstract for JP-A-2005-314503.
English Language Abstract for JP-A-10-060101.
English Language Abstract for JP-A-10-130256.
English Language Abstract for JP-A-8-283392.
Lauteschlaeger, S.; Extended European Search Report from corresponding European patent application No. 10789463; Jun. 17, 2013; pp. 1-8, European Patent Office, Munich, Germany.
Office Action for corresponding Chinese application No. 201080027304.7 dated Mar. 5, 2014.

* cited by examiner

METHOD FOR PRODUCING POLYLACTIC ACID

This application is a 371 application of PCT/JP2010/060052, filed Jun. 14, 2010, which, in turn, claims priority of Japanese Patent Application No. 2009-146825, filed on Jun 19, 2009.

TECHNICAL FIELD

The present invention relates to a method for producing polylactic acid.

BACKGROUND ART

Polylactic acid has been drawn attention as a polymer which has carbon-neutral property not giving influence on increase or decrease of carbon dioxide on the earth and can be utilized in various applications, because lactic acid as a raw material is made from potato, corn, sugar cane or the like. In addition, it has also been drawn attention in view of easiness in recovery from a waste product because of having superior melt moldability, strength or the like as a polymer, as well as, biodegradability or its promotion effect of decomposition by water. However, it has a problem of low heat resistance or low rigidity, which allows practical application only in a limited range. As a conventional continuous method for producing polylactic acid, there has been proposed, in PATENT LITERATURE 1 (U.S. Pat. No. 5,136,017, CA-A1-2056549, EP-A2-0499747), the one having a plurality of Continuous Stirred Tank Reactors (hereafter may also be referred to simply as "CSTR-type reactor") connected in series. In addition, in PATENT LITERATURE 2, there has been proposed one where a plurality of CSTR-type reactors, a horizontal-type reactor and a mixing machine are combined.

PRIOR ART LITERATURE

Patent Literature

PATENT LITERATURE 1: JP-A-5-93050
PATENT LITERATURE 2: JP-A-10-120772

SUMMARY OF INVENTION

Problem to be Solved by the Invention

In the case where most parts of polymerization is made completed by connecting in series a plurality of CSTR-type reactors as described in PATENT LITERATURE 1 and PATENT LITERATURE 2, high molecular weight polylactic acid can be obtained by decreasing amount of a polymerization catalyst and taking longer residence time. However, in the CSTR-type reactor, as a result of short pass of a raw material, a low molecular weight polymer having short residence time will be contaminated into a product. Therefore, to obtain high molecular weight polylactic acid, very long mean residence time is required, which also gives broad molecular weight distribution, and thus it is difficult to obtain polylactic acid with sharp molecular weight distribution or a desired molecular weight distribution. Further, presence of a polymer with long residence time in a reactor results in generation of a polymer with high yellowness. In addition, in a large scale reactor, because of high viscosity of a polymer, uniform mixing becomes very difficult, which thus requires large stirring power. In addition, increase in polymerization rate requires taking long residence time in a reactor at the later stage, which needs a larger reactor, and thus becomes economically disadvantageous. Still more, because increase in reaction temperature shifts equilibrium to a lactide side, polymerization rate cannot be increased, also to give low molecular weight. To prevent these problems from occurring, many CSTR-type reactors may be connected in series, however, it is not economical.

Accordingly, it is an object of the present invention to provide a method for producing polylactic acid, which is capable of obtaining polylactic acid at low cost, and having high molecular weight, low yellowness and desired molecular weight distribution.

Means for Solving the Problem

The present inventors have performed intensive study in view of the above-described conventional technology, and, as a result, found that a production method for polymerization, using at least one reactor having plug flow characteristics, is capable of providing polylactic acid at low cost, and having high molecular weight, and have thus completed the present invention.

That is, the present invention is a method for producing polylactic acid by polymerizing molten lactide using at least one reactor having plug flow characteristics with $\xi(\tau)$, calculated from the following FORMULA (1), of 0.3 or smaller:

[FORMULA 1]

$$\xi(\tau)=\int_0^\infty (E(\tau) \times ABS(1-\tau))d\tau \qquad (1)$$

In the FORMULA (1), $E(\tau)$ is a residence time distribution function determined by impulse response by starch syrup having a viscosity of 3 Pa·s, and $\tau$ is ratio of elapsed time $\theta$ and mean residence time $\theta_0$.

Effect of the Invention

According to the present invention, there can be provided a method for producing polylactic acid, which is capable of obtaining polylactic acid at low cost, and having high molecular weight.

Still more other objects, characteristics and features of the present invention will become apparent by referring to the following explanation and preferable embodiments exemplified in the accompanying drawings.

MODE FOR CARRYING OUT THE INVENTION

Explanation will be given below in detail on the method for producing polylactic acid of the present invention.

A first aspect of the present invention is a method for producing polylactic acid by polymerizing molten lactide using at least one reactor having plug flow characteristics with $\xi(\tau)$, calculated from the following FORMULA (1), of 0.3 or smaller:

[FORMULA 2]

$$\xi(\tau)=\int_0^\infty (E(\tau)\times ABS(1-\tau))d\tau \qquad (1)$$

wherein $E(\tau)$ in the FORMULA (1) is a residence time distribution function determined by impulse response by starch syrup having a viscosity of 3 Pa·s, and $\tau$ is ratio of elapsed time $\theta$ and mean residence time $\theta_0$.

Figure 1:
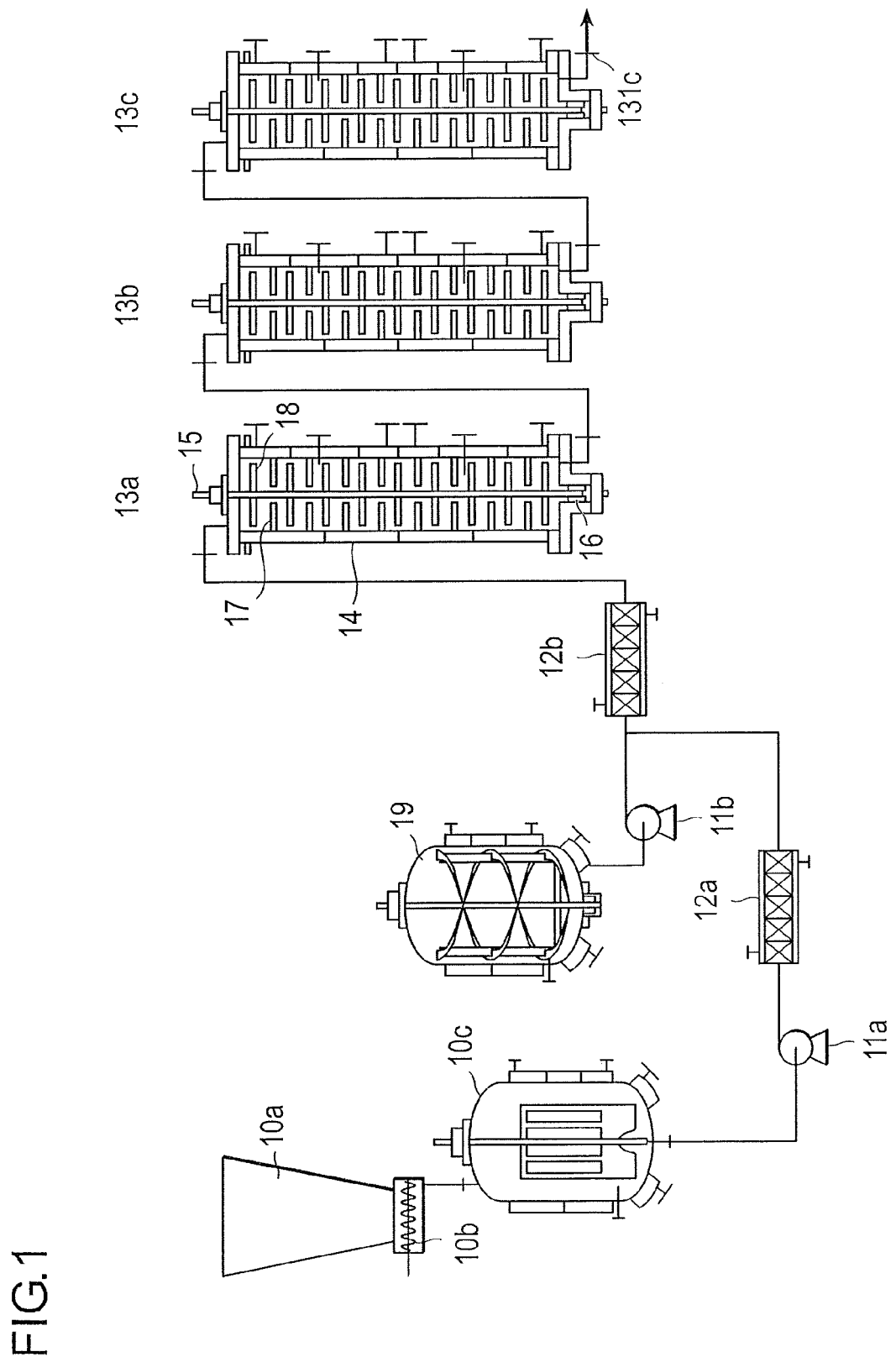
FIG. 1 is a schematic total block diagram showing one example of a production apparatus to be used in the production method of the present invention.

FIG. 1 is a schematic total block diagram showing one preferable embodiment of a production apparatus to be used in the production method of the present invention. Lactide as a raw material is sent, after being pretreated in a lactide pretreatment tank 10a, to a lactide melting tank 10c by a feeder 10b to be melted. The molten lactide is sent to a reactor having plug flow characteristics 13a through a heat exchanger 12a and a mixing machine 12b by a liquid supplying pump 11a installed at the lower part of the apparatus. The reactor 13a is equipped with a jacket 14. A rotating axis 15 is inserted from the upper part of the reactor 13a, and a bearing 16 is installed at the lower part. In addition, a cooling tube group 17 and a stirring blade 18 are stored alternately inside the reactor 13a. A reaction mixture is sent to the reactors 13a, 13b and 13c continuously in this order and drawn out from an outlet 131c of the reactor 13c. In FIG. 1, three reactors having plug flow characteristics (13a, 13b, 13c) are connected in series, however, effect of the present invention can be exerted when at least one reactor is present. It should be noted that a polymer melting tank 19 and a liquid supplying pump 11b are those to be used in the case of producing a polylactic acid block copolymer represented by stereo complex polylactic acid, whose detail will be described later.

Figure 2A:
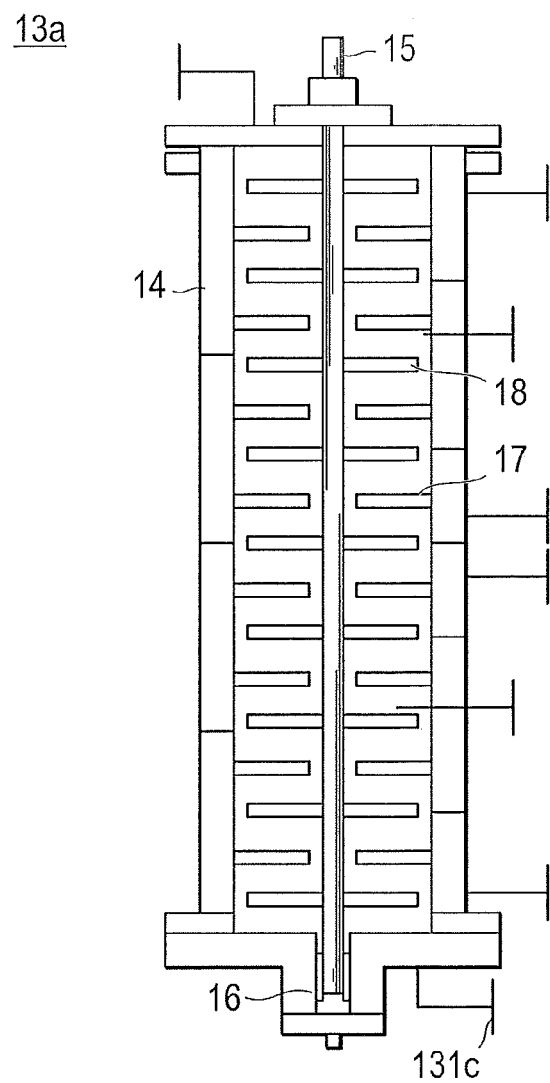
FIG. 2 is a schematic magnified view showing one example of a reactor having plug flow characteristics, wherein A represents a cross-sectional schematic view, and B represents a schematic view of a lower face.
Figure 2B:
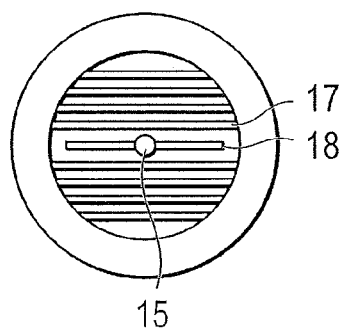

FIG. 2 is a schematic view of a reactor 13a (13b, 13c), in further magnification, wherein A represents a longitudinal section schematic view, and B represents a schematic view of a lower face cross-section. The reactor 13a is a reactor having a long cylindrical container in a flow direction, and is equipped with a jacket 14, where heating, keeping temperature and cooling may be performed as appropriate. The jacket 14 is divided in multiple, which is controllable each under different temperature condition. Said jacket 14 may not be divided. The relevant stirring blade has a stirring axis extending in a flow direction, and has one stage or multiple stages of stirring blades extending in a vertical direction relative to said stirrer axis. As examples of the stirring blades 18 to be used, for example, a multiple pieces of puddle blades, a bar-like blade or the like is included. In addition, one stage or multiple stages of cooling tube groups are provided inside the container.

The reactor 13a (13b, 13c) may be used by being placed either vertically or horizontally, however, to avoid deflection of an axis or malflow, it is preferable to be used by being placed vertically. In the case where it is placed vertically, a flow direction of a raw material or a reactant may be an upward direction or a downward direction relative to a horizontal plane, however, in the case where a polymer substance has higher density, the downward direction is preferable to suppress reversed flow. In the reactor 13a of FIG. 2, a feed nozzle is not shown at a reactor side, however, it may be added as appropriate.

Explanation is given here on plug flow characteristics. In the present invention, value $\xi(\tau)$ showing plug flow characteristics may be determined, for example, by the following method. Into a reactor, starch syrup whose viscosity has been adjusted to 3 Pa·s, that is, starch syrup for feeding, has been flown in advance in the same feed rate as practical flow rate. This starch syrup for feeding and red ink generally sold commercially are mixed in the same volume, in advance, to prepare red ink for injection, which is taken into an injector. Amount to be taken into the injector should be about one thousandth of amount of starch syrup for feeding to be flown per hour. The red ink for injection taken into this injector is charged pulse-likely to the inlet part of a reactor, and sampled periodically at the outlet of the reactor to determine absorbance As of the outlet liquid. On the other hand, absorbance Aso of the red ink for injection should be measured in advance. Because it has been confirmed in a preliminary experiment that absorbance is proportional to concentration, ratio E of the red ink remained in the reactor is determined by E=(Vr)×(As)/((Vo)×(Aso)). Here, Vr is volume of the reactor; Vo is volume of the red ink injected. In this way, by plotting value E ($\theta$) at elapsed time $\theta$, a residence time distribution curve is determined. For easy comparison, a curve of $E_0(\tau)$ for value $\tau$ obtained by dividing elapsed time with mean residence time, should be adopted as the residence time distribution curve. Mean residence time $\theta_0$ is calculated by Vr/F, wherein F is feed volume flow rate. Ideally, area of the curve of $E_0(\tau)$ for $\tau$ should be 1, however, because $E(\tau)$ can be determined practically only for every sampling time, and usually it does not become 1 due to measurement error or the like, and it is normalized so as to become 1 by multiplying a coefficient k to $E(\tau)$. Specifically, it is calculated by the following FORMULAS (2) and (3), provided that elapsed time of the i-th sample is $\theta_i$, $\tau_i=\theta_i/\theta_0$, and n-th sample is the last sample.

[FORMULA 3]

$$\int_0^\infty (E(\tau)d\tau = \sum_{i=1}^{n}[\{k\times E(\tau_{i-1})+k\times E(\tau_i)\}\times(\tau_i-\tau_{i-1})/2]=1 \qquad (2)$$

$$\int_0^\infty (E(\tau)\times ABS(1-\tau))d\tau = \qquad (3)$$
$$\sum_{i=1}^{n}[\{k\times E(\tau_{i-1})+k\times (E(\tau_i))\}\times(\tau_i-\tau_{i-1})\}/2\times$$
$$ABS\{1-(\tau_{i-1}+\tau_i)/2\}]$$

It should be noted that absorbance As is calculated by As=log($I_0$/I). $I_0$ is transmittance of starch syrup for feeding, and absorption meter is adjusted so that $I_0$ is 100%. I is transmittance of a sample. Since absorbance of the red ink for injection has too high concentration when measured as it is, 0.5 ml of the red ink for injection is diluted with 100 ml of the starch syrup for feeding, which is then diluted to 1000 ml with pure water to determine absorbance thereof, and the value is multiplied by 2000 times for calculation. In addition, value of $\xi(\tau)$ changes a little by rotation number of a stirring blade, however, optimal rotation number was selected which does not make a retention portion of the red ink in a test reactor prepared by an acrylic cylinder. Because value of $\xi(\tau)$ changes a little also by viscosity of a polymerization solution, it is preferable to test at viscosity near that of the practical polymerization solution, however, in view of selection of a reactor, the same viscosity was used in all measurements of plug flow characteristics. In addition, since plug flow characteristics is generally high in the case of high viscosity at the later stage of polymerization, measurement is performed by setting viscosity of liquid at 3 Pa·s, by putting importance on plug flow characteristics at the initial stage of polymerization.

Figure 3:
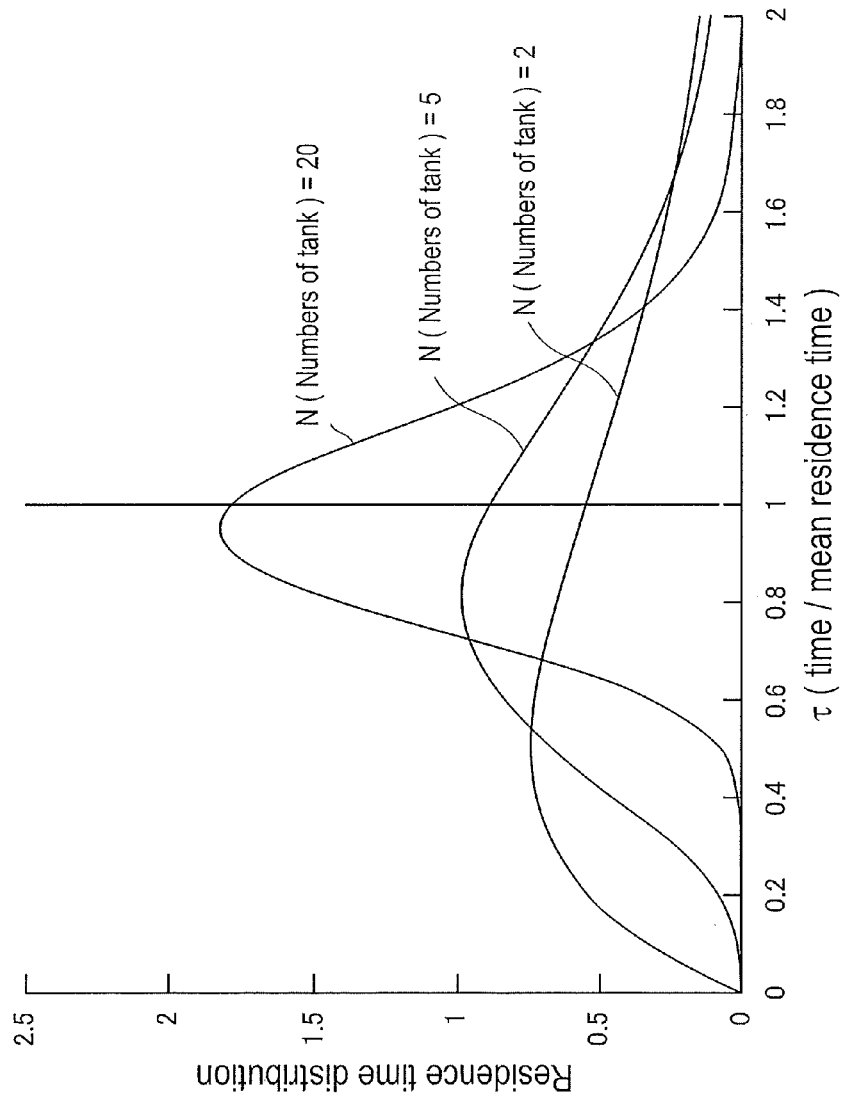
FIG. 3 is a graph showing a residence time distribution curve of a complete mixing tank series model as a mixing model inside a reactor.
Figure 4:
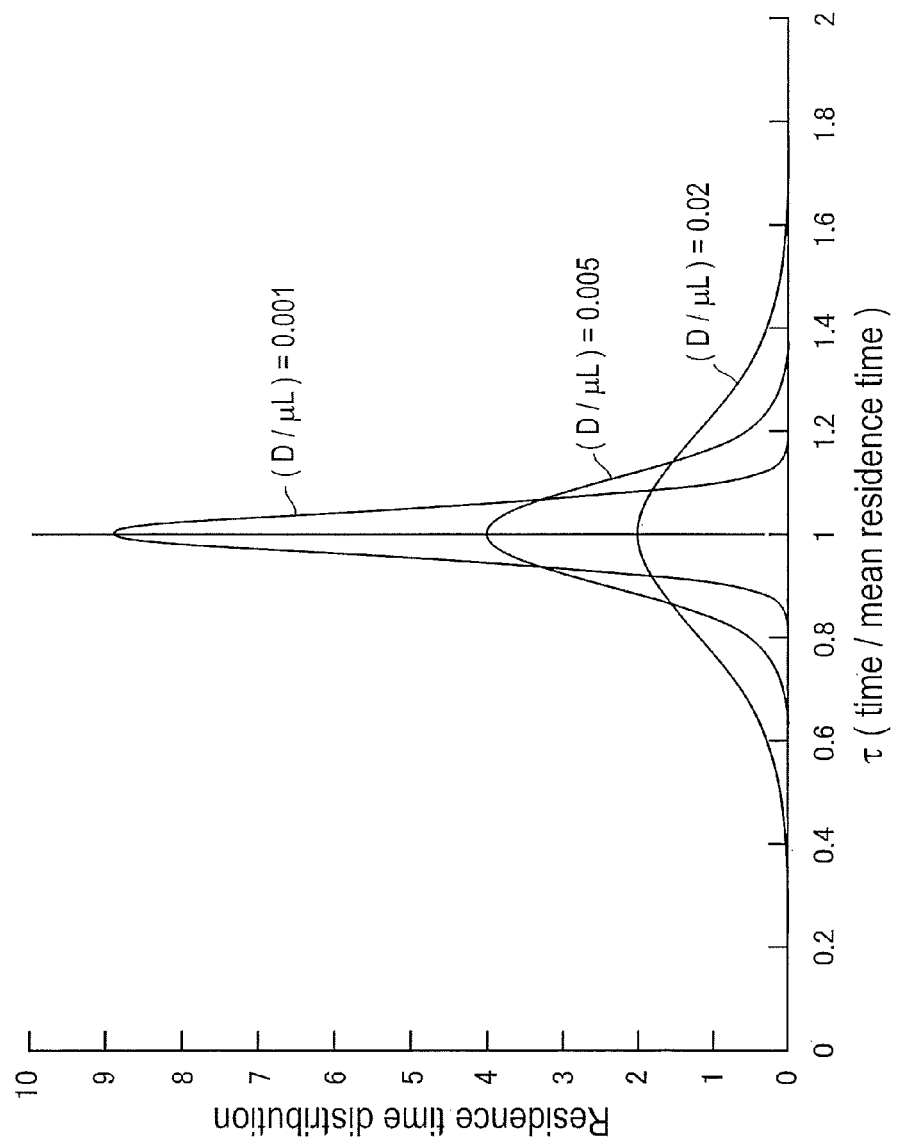
FIG. 4 is a graph showing a residence time distribution curve of a dispersion model as a mixing model inside a reactor.

$\xi(\tau)$ in the above FORMULA (1), which is used as an index of plug flow characteristics, represents average deviation from $\tau=1$, and the higher this value gives the larger deviation is and, showing far from ideal plug flow characteristics. As an ideal mixing model of the inside of a reactor, there are a plug flow model and a complete mixing model. A practical reactor shows an intermediate state of the two models, and becomes a complete mixing tank series model or a dispersion model or the like. A residence time distribution curve of each model becomes the one as shown in FIG. 3 and FIG. 4, and it has been known that the nearer plug flow is attained in the more tank number in the complete mixing tank series model, as well as the smaller $D/(\mu L)$ (D: dispersion coefficient in an axis direction, $\mu$: flow rate in a reaction tube and L: length of the reaction tube) in the dispersion model. In an ideal plug flow model, only a straight line is observed which appears at $\tau=1$. Therefore, as is apparent from FIG. 3 and FIG. 4, it is understood that a curve with the larger average deviation from $\tau=1$ has the lower plug flow characteristics. In the production method of the present invention, molten lactide is preferably supplied continuously to the reactor having plug flow characteristics with $\xi(\tau)$ in the FORMULA (1), of 0.3 or smaller.

$\xi(\tau)$ in the FORMULA (1) is preferably 0.2 or lower, and more preferably 0.15 or lower.

It should be noted that in the case of using a plurality of reactors having the plug flow characteristics, $\xi(\tau)$ of the whole reaction system can be calculated by injecting the red ink into the inlet of the reactor having plug flow characteristics at the most front stage, and sampling it from the outlet of the reactor having plug flow characteristics at the last stage, to apply a calculation method for the $\xi(\tau)$. $\xi(\tau)$ of the whole reaction system is preferably 0.2 or lower, and more preferably 0.1 or lower.

As examples of the reactor having plug flow characteristics other than the reactor shown in FIG. 2, there are included, for example, a reactor installed with a stirring blade having a baffle plate and a heat exchanger alternately, described in JP-B-1-3444; a reactor installed with a cooling coil and a stirring blade alternately in two or more stages described in U.S. Pat. No. 2,727,884; or a tube-type reactor having a static mixer element inside a cylinder tube, for example, a static mixer (SMX) manufactured by SULZER Co., Ltd., a static mixer manufactured by Noritake Co., Ltd., a static mixer (ULTRA MIXER) manufactured by KOMAX Co., Ltd., and a static mixer reactor (SMR) manufactured by SULZER Co., Ltd. having function of removing heat of reaction by flowing cooling medium inside the static mixer element; or the like. A reactor not having a stirring machine as the static mixer or SMR is superior in view of no energy consumption of the stirring machine, however, in the case where a retention portion generates inside the reactor in the worst case, there may be the case where elimination of the retention portion by operation condition becomes difficult, resulting in requiring some kind of dynamic apparatuses. On the other hand, such a type as shown in FIG. 2 is more preferable, because it is superior in that increase in rotation number of the stirring machine is possible and the retention portion can be eliminated by change of operation condition, when power or strength or the like is designed with sufficient allowance, because it is installed with the stirring machine.

<Melting of Lactide>

In the production method of the present invention, lactide of a raw material is melted in advance, before introducing it into the reactor having plug flow characteristics.

Lactide to be used as a raw material is not especially limited, and any of L-lactide, D-lactide and DL-lactide may be used.

It is preferable that before lactide is melted, solid lactide is charged in a lactide pretreatment tank, dried under reduced pressure, and then dried till water content attains 50 ppm or lower, by repeating operations of depressurization and pressurization with inert gas having a purity of preferably 99.9% by mass or higher, and still more stored in a state that oxygen concentration is preferably 0.1% by mass or lower.

It is preferable that lactide is continuously sent into a lactide melting tank blanketed with inert gas having a purity of preferably 99.9% by mass or higher, using a feeder blanketed with inert gas having a purity of preferably 99.9% by mass or higher. In the case where blanket is performed using inert gas having a purity below 99.9% by mass, or blanket is not performed, lactide may decompose, resulting in generation of lactic acid, which thus may not provide a high molecular weight polymer with little coloring in some cases.

It is preferable that the lactide melting tank has a jacket and a stirring machine, so as to heat lactide by flowing steam or heat medium into the jacket, for melting lactide at a temperature range of preferably 120° C. or lower, and more preferably from 100 to 120° C. In addition, it is preferable that molten lactide is drawn out continuously so that melting time (that is, mean residence time inside the melting tank) becomes preferably 2 hours or shorter, and more preferably from 30 to 60 minutes. High melting temperature or long melting time may result in the case of accelerating decomposition of lactide.

Here, as the feeder, for example, a mechanical feeder, such as, a screw feeder, a ribbon feeder, or a table feeder and the like; or pneumatic feeder using inert gas having a purity of 99.9% by mass or higher, "Super Dense Flow" (manufactured by Nisshin Seifun Group Inc.), or the like may be used. As a stirring blade of the lactide melting tank, a general stirring blade to be used in a relatively low viscosity solution may be used, for example, there is included an inclined puddle blade, a propeller blade, an anchor blade, Max Blend (registered trade name) blade, manufactured by Sumitomo Heavy Industries, Ltd. or the like.

<Preliminary Polymerization of Lactide>

At a stage with low polymerization rate of lactide, because of low viscosity of a reaction mixture, plug flow characteristics may be decreased. Therefore, before a polymerization reaction in the reactor having plug flow characteristics, preliminary polymerization of lactide may be performed. It is preferable that a reactor to be used in this preliminary polymerization (hereafter, it may also be referred to simply, a "preliminary reactor") is installed at a stage before the reactor having plug flow characteristics. As examples of the preliminary reactor, there are included, a tube-type reactor having a static mixer element inside a cylindrical tube, for example, a static mixer SMX manufactured by SULZER Co., Ltd., a static mixer manufactured by Noritake Co., Ltd., or a static mixer ULTRA MIXER manufactured by KOMAX Co., Ltd., or the like; the CSTR-type reactor having a stirring blade such as, an inclined paddle blade, an anchor blade, a Full Zone (registered trade name) blade manufactured by Kobelco Eco-Solutions Co., Ltd, a Max Blend (registered trade name) blade manufactured by Sumitomo Heavy Industries, Ltd, or a draft screw blade described in JP-B-47-610, or the like; or a reactor which realize complete mixing similarly as the CSTR-type reactor by installing the tube-type reactor and a pump in loop state and circulating liquid in the loop using a pump; or the like. In view of necessity to prevent an abnormal reaction, in a low viscosity region due to low polymerization rate, the CSTR-type reactor is more preferable.

Conversion rate (polymerization rate) of lactide in said preliminary reactor is preferably 30% or lower, and more preferably 15% or lower. It should be noted that, in the present invention, as the polymerization rate (conversion rate) of lactide, a value obtained by a calculation method described in Examples to be described later should be adopted.

In addition, temperature of lactide to be fed to the preliminary reactor may be raised by installing a heat exchanger before the preliminary reactor. In addition, a polymerization catalyst and a polymerization initiator to be described later may be fed just before the preliminary reactor, or may be fed portion-wise to the reactor having plug flow characteristics at or after the preliminary reactor. In this case, the polymerization catalyst and the polymerization initiator may be fed by making it dissolved in a solvent or making it slurry.

<The Polymerization Catalyst and the Polymerization Initiator>

The polymerization catalyst is not especially limited, and a known one may be used, however, tin octylate (tin 2-ethylhexanate) is preferable in view of high productivity and easy availability. Used amount thereof is preferably from 0.002 to 0.02% by mass, and more preferably from 0.005 to 0.01% by mass, relative to 100% by mass of lactide before polymerization. The amount outside this range may provide the case where molecular weight decreases caused by an ester exchange reaction during polymerization or depolymerization, or may provide the case where control of polymerization temperature becomes difficult.

In the case where ring-opening polymerization is carried out in the presence of the polymerization catalyst, a polymerization initiator may be used. Examples of the polymerization initiator include, for example, a higher aliphatic alcohol such as decanol, dodecanol, tetradecanol, hexadecanol, octadecanol, or lauryl alcohol or the like; an alkylene glycol such as ethylene glycol, propylene glycol; or the like. They may be used alone or two or more kinds in combination. Used amount of the polymerization initiator may be adjusted as appropriate corresponding to molecular weight of a final product desired.

<Polymerization Time and Polymerization Temperature>

Polymerization time of lactide is preferably 15 minutes to 10 hours, and more preferably 30 minutes to 6 hours. The polymerization time below 15 minutes may provide the case where an objective polymer cannot be obtained due to insufficient reaction, while the polymerization time over 10 hours may provide the case where coloring or dispersion degree of the resultant polymer or the like increases.

Polymerization temperature of lactide is preferably from 150° C. to 250° C., more preferably from 170° C. to 230° C., and further preferably from 180° C. to 220° C. The reaction temperature below 150° C. may not provide the case where effect of cutting down production cost of polylactic acid can be obtained because of slow progress of a reaction. The reaction temperature over 250° C. may provide the case where high polymerization rate cannot be obtained because reaction control becomes difficult and significant generation of lactide by depolymerization of a polymer, or could significantly increase coloring of the resultant polymer, and thus could limit applications of the resultant polymer.

Molten lactide is preferably fed to at least one reactor having plug flow characteristics with $\xi(\tau)$ of the above FORMULA (1) of 0.3 or smaller, and polymerized so that conversion rate (polymerization rate) of liquid lactide at the outlet, obtained from the reactor having plug flow characteristics at the final stage, is 90% or higher. That is, in the case where only one reactor having plug flow characteristics is used, it is preferable that conversion rate (polymerization rate) of liquid lactide at the outlet of said reactor is preferably 90% or higher, and in the case where a plurality of reactors having plug flow characteristics are used, it is preferable that conversion rate (polymerization rate) of liquid lactide at the outlet from the reactor at the final stage, among the reactors having plug flow characteristics, is 90% or higher.

Said conversion rate (polymerization rate) is more preferably 95% or higher.

<Addition of a Stabilizer>

By addition of a stabilizer after completion of a polymerization reaction of lactide, decrease in molecular weight in recovering unreacted lactide can be prevented. It is preferable that the stabilizer is mixed to outlet liquid from the last stage reactor in the reactors having plug flow characteristics. That is, in the case where only one reactor having plug flow characteristics is used, it is preferable that the stabilizer is mixed to outlet liquid of said reactor, and in the case where a plurality of reactors having plug flow characteristics are used, it is preferable that it is mixed to outlet liquid from the last stage reactor among the reactors having plug flow characteristics.

Used amount of the stabilizer is preferably 0.0005 to 0.02% by mass, and more preferably 0.001 to 0.01% by mass, relative to the resultant polymer substance. The used amount below 0.0005% by mass may provide the case where effect of the stabilizer cannot be obtained sufficiently. On the other hand, the used amount over 0.02% by mass may provide the case, depending on the kind of the stabilizer, where hue of the final product is deteriorated, or stability such as hydrolysis resistance or the like is deteriorated.

Examples of the stabilizer include, for example, a phenolic antioxidant, such as 2,6-dimethylphenol, 2,6-di-t-butylphenol, 2,4-dimethylphenol, 2,4-di-t-butylphenol, 2,4,6-trimethylphenol, 2,4,6-tri-t-butylphenol, 2,6-di-t-butyl-4-methylphenol, 2,2'-methylenebis(4-methyl-6-t-butylphenol), 2,2'-thiobis(4-methyl-6-t-butylphenol), 3,5-di-t-butylcatecol, lignin, or the like. Among them, 2,6-di-t-butyl-4-methylphenol, 2,4,6-tri-t-butylphenol, or 2,2'-methylenebis(4-methyl-6-t-butylphenol) are preferable in terms of having low volatility and easy handling. In addition, in view of safety or reduction of environmental load, use of lignin, which is a component derived from a plant, is also preferable.

In addition, a phosphoric acid-type deactivation agent may be added as a deactivation agent of the polymerization catalyst, after completion of a polymerization reaction of lactide. Examples of the phosphoric acid-type deactivation agent preferably include, for example, at least one kind selected from the group consisting of phosphoric acid, phosphorous acid, hypophosphorous acid, pyrophosphoric acid, polyphosphoric acid, alkyl ester thereof, aryl ester thereof, and metal salt thereof. In terms of quenching capability for the polymerization catalyst, phosphoric acid, phosphorous acid, pyrophosphoric acid, or polyphosphoric acid is more preferable.

A method for uniformly mixing the stabilizer and/or the deactivation agent includes, for example, a method for using the same type mixing machine as the reactor having plug flow characteristics, a method for using a mixing machine described in JP-B-51-48581, or the like.

High content of lactide in a polymer obtained finally may provide the case where processability becomes worse or stability of the resultant molded article is lowered, in molding to a final product. Therefore, it is preferable to remove unreacted lactide after mixing the stabilizer and/or the deactivation agent. As an example of a method for removing lactide from a polymer substance, for example, there is a method for evaporating lactide by heating a polymer substance in a molten state inside a depressurization apparatus. And, in evaporation of lactide, for example, it is general that not only to heat the amount equivalent to latent heat inside or before the depressurization apparatus but also perform operation to decrease viscosity by raising polymer temperature or perform mixing or stirring in the depressurization apparatus to increase area for evaporation. However, as a result, polymer temperature increases, which may bring about decrease in molecular weight or coloring. To avoid such a problem and to enhance effect of lactide removal, as well as to reduce stirring power, it is preferable to decrease viscosity by mixing a solvent to a reaction product in a range of 10 to 50% by mass. In this case, as examples of a solvent to be used, there are included, for example, an aromatic compound such as toluene, ethylbenzene or the like; an aliphatic hydrocarbon such as pentane, hexane, heptane, octane or the like; an alicyclic hydrocarbon such as cyclobutane, cyclopentane, cyclohexane, cycloheptane, cyclooctane or the like; a halogenated hydrocarbon such as dichloromethane, chloroform, dichloroethane or the like; an ether-type solvent such as 1,4-dioxane, tetrahydrofuran, ethylene glycol dimethyl ether, anisole, or the like.

As examples of an apparatus to remove lactide, there are included, for example, an apparatus directly mounted with a heat exchanger at a depressurization tank as described in JP-B-48-29797; a thin film evaporator such as Exeva (registered trade name) manufactured by Kobelco Eco-Solutions Co., Ltd., a commercial name, Contro, manufactured by Hitachi Ltd.; or an extruder such as HVR, a commercial name, manufactured by Mitsubishi Heavy Industries, Ltd.; or the like. In the case of using an extruder, addition of the above-described stabilizer and removal of lactide can be performed in the same apparatus, and it is thus more preferable. Use of these apparatuses to remove lactide is capable of decreasing residual lactide more, by connecting two or more apparatuses in series.

In the production method of the present invention, at least one reactor having plug the flow characteristics may be used, however, by using two or more such reactors, higher polymerization rate can be obtained.

A structure of polylactic acid obtained by the production method of the present invention is not especially limited, and any structure of polylactic acid may be allowed, such as poly-L-lactic acid where the structure unit is L-lactic acid; poly-D-lactic acid where the structure using is D-lactic acid; poly-DL-lactic acid where an L-lactic acid unit and a D-lactic acid unit are present randomly; a polylactic acid block copolymer composed of the poly-L-lactic acid block and the poly-D-lactic acid block in an arbitrary composition ratio; or a mixed substance thereof, or the like.

Weight average molecular weight of polylactic acid obtained by the production method of the present invention is preferably 10,000 to 500,000, more preferably 30,000 to 400,000, and further preferably 50,000 to 300,000. The weight average molecular weight within the above range is capable of providing polylactic acid superior in mechanical strength and molding processability. It should be noted that, in the present invention, as the weight average molecular weight, a value converted to polystyrene, measured by a GPC (Gel Permeation Chromatography) method should be adopted. In further detail, a value measured by a method described in Examples should be adopted.

The production method of the present invention may be suitably used in producing stereo complex polylactic acid, which is a stereo complex substance of polylactic acid composed of the poly-L-lactic acid block and the poly-D-lactic acid block in an arbitrary composition ratio. In view of superior mechanical strength, heat resistance and thermal stability, it is preferable that stereo complex polylactic acid has characteristics of high molecular weight, high melting point and high crystallinity. Because the reactor having plug flow characteristics to be used in the present invention is capable of narrowing a residence time distribution of a monomer, monomer ratio in charging can be maintained as it is as mass ratio of the block, as well as reaction rate of the polymer substance can be increased, and thus melting point of the resultant stereo complex polylactic acid block copolymer can be highered further, and a polymer with low yellowness can be obtained.

That is, a second aspect of the present invention is a method for producing stereo complex polylactic acid, composed of: (A1) a step for obtaining poly-L-lactic acid by polymerization of L-lactide; (B1) a step for mixing the poly-L-lactic acid and D-lactide; and (C1) a step for polymerizing the D-lactide to the poly-L-lactic acid; wherein at least one of the (A1) step and the (C1) step is performed by the above production method for polylactic acid. In addition, a third aspect of the present invention is a method for producing stereo complex polylactic acid, composed of: (A2) a step for obtaining poly-D-lactic acid by polymerization of D-lactide; (B2) a step for mixing the poly-D-lactic acid and L-lactide; and (C2) a step for polymerizing the L-lactide to the poly-D-lactic acid; wherein at least one of the (A2) step and the (C2) step is performed the above production method for polylactic acid.

By polymerization, in advance, of poly-L-lactic acid or poly-D-lactic acid with arbitrary molecular weight using L-lactide or D-lactide, mixing lactide which has different chirality from the lactide used in the previous polymerization and sequentially performing polymerization, stereo complex polylactic acid which is a form of a block copolymer can be produced. Here, amount of unreacted lactide in the poly-D-lactic acid or the poly-L-lactic acid produced previously influences on melting point of stereo complex polylactic acid finally obtained. However, by producing poly-D-lactic acid or poly-L-lactic acid in advance using the reactor having plug flow characteristics, a polymerization rate of preferably 90% or higher can be attained, and amount of the unreacted lactide can be reduced. Therefore, it becomes extremely rare that presence or absence of a removal step of lactide in producing stereo complex polylactic acid gives influence on heat resistance of a product, which has been observed conventionally. It is advantageous because also meting point of stereo complex polylactic acid obtained finally becomes preferably 200° C. or higher. Even in ironing at 160° C., or still higher (about 180° C.), in the case where polylactic acid is applied as fiber as an application of polylactic acid, which has conventionally been unsuitable, stereo complex polylactic acid obtained by the production method of the present invention can be applied widely to a fiber product without giving damage to fiber cloth. In addition, because of having good hue, use to an optical material or the like requiring high transparency is also possible. As described above, the one having equivalent characteristics as compared with conventional stereo complex polylactic acid can be obtained.

In producing a polylactic acid block copolymer such as the above stereo complex polylactic acid or the like, it is preferable that the poly-L-lactic acid or the poly-D-lactic acid obtained in advance is melted in a polymer melting tank (for example, 19 of FIG. 1) and then introduced to the reactor having plug flow characteristics using a liquid supplying pump (for example 11b of FIG. 1).

In addition, in the step for mixing the poly-L-lactic acid and D-lactide or the step for mixing the poly-D-lactic acid and L-lactide, which is the (B1) and (B2) steps, it is preferable that a mixing machine is a static mixer. Use of the static mixer, in mixing such a high viscosity substance and a low viscosity substance, has advantage of smaller energy consumption as compared with a dynamic mixer, as well as easy maintenance. Specific examples of the static mixer include, for example, a static mixer SMX manufactured by SULZER Co., Ltd., a static mixer manufactured by Noritake Co., Ltd., a static mixer, ULTRA MIXER, manufactured by KOMAX Co., Ltd. or the like.

The above stereo complex polylactic acid obtained by the production method of the present invention preferably has a melting point of stereo complex crystal of preferably from 190 to 250° C., more preferably from 195 to 250° C., and further preferably from 200 to 250° C., which is observed in a temperature raising process by repeating three times a program composed of a temperature raising process from 30 to 250° C. and a temperature decreasing process from 250 to 30° C., using a differential scanning calorimetry (DSC).

In addition, content ratio of stereo complex crystal of stereo complex polylactic acid obtained by the production method of the present invention is preferably from 80 to 100% by mass, more preferably from 90 to 100% by mass, and further preferably from 95 to 100% by mass. Furthermore, enthalpy of fusion (ΔHms) of stereo complex crystal, appearing at from 190 to 250° C., of stereo complex polylactic acid obtained by the production method of the present invention, is preferably 10 J/g or larger, more preferably 20 J/g or larger, and further preferably 30 J/g or larger. When melting point of stereo complex crystal is within the above range, by repeating three times such a program as above, it means that only stereo complex crystal grows, even by repeating melting and crystallization. In the case where crystal melting point is below 190° C., which is observed in temperature raising process, in repeating process of the above program of melting and crystallization three times, performance as stereo complex polylactic acid may decrease in some cases. On the other hand, the crystal melting point over 250° C. may provide the case where mechanical characteristics or the like is impaired caused by decrease in molecular weight by thermal decomposition of polylactic acid in molding processing. It should be noted that as content ratio of stereo complex crystal in the present invention, a value calculated by the method described in Examples to be described later should be adopted.

For stereo complex polylactic acid obtained by the production method of the present invention to show superior heat resistance, it is preferable that melting point of the stereo complex crystal, content ratio of the stereo complex crystal, and the enthalpy of fusion are within the above numerical value range.

Mass ratio of an L-lactic acid unit (a poly-L-lactic acid block) and a D-lactic acid unit (a poly-D-lactic acid block) in stereo complex polylactic acid obtained by the production method of the present invention is preferably the L-lactic acid unit/the D-lactic acid unit=91/9 to 9/91. More preferably, the L-lactic acid unit/the D-lactic acid unit=85/15 to 15/85. The mass ratio of the L-lactic acid unit and the D-lactic acid unit outside the range may provide the case where content ratio of stereo complex crystal in the resultant polylactic acid decreases largely.

It should be noted that, in the reactor having plug flow characteristics to be used in the present invention, a copolymer may also be produced by copolymerization of lactide and a monomer other than lactide. As examples of a composition unit derived from a compound other than lactic acid, which may be contained in the copolymer, there are preferably included, for example, a unit derived from a dicarboxylic acid, a unit derived from a polyvalent alcohol, a unit derived from a hydroxycarboxylic acid, or a unit derived from a lactone, as well as a unit derived from a polyester, a unit derived from a polyether, or a unit derived from a polycarbonate, obtained from these composition units, or the like. However, it should not be limited to these.

Examples of the dicarboxylic acid preferably include, for example, succinic acid, adipic acid, azelaic acid, sebacic acid, terephthalic acid, isophthalic acid or the like. Examples of the polyvalent alcohol preferably include, for example, an aliphatic polyvalent alcohol such as ethylene glycol, propylene glycol, butanediol, pentanediol, hexanediol, octanediol, glycerin, sorbitan, neopentylglycol, diethylene glycol, triethylene glycol, polyethylene glycol, or polypropylene glycol or the like; an aromatic polyvalent alcohol in which ethylene glycol is adducted to bisphenol, or the like. Examples of the hydroxycarboxylic acid preferably include, for example, glycolic acid, hydroxybutyric acid or the like. Examples of the above-described lactone preferably include, for example, glycolide, ε-caprolactone glicolide, ε-caprolactone, β-propiolactone, δ-butyrolactone, β-butyrolactone, γ-butyrolactone, pivalolactone, δ-valerolactone or the like.

Weight average molecular weight and/or molecular weight distribution of polylactic acid obtained by the production method of the present invention can be controlled by amount of the polymerization catalyst and/or polymerization initiator, along with polymerization temperature. However, in the case where two or more reactors having plug flow characteristics are used, weight average molecular weight and/or molecular weight distribution of polylactic acid may be controlled also by controlling a residence time distribution of a reaction mixture inside said reactors.

Figure 5:
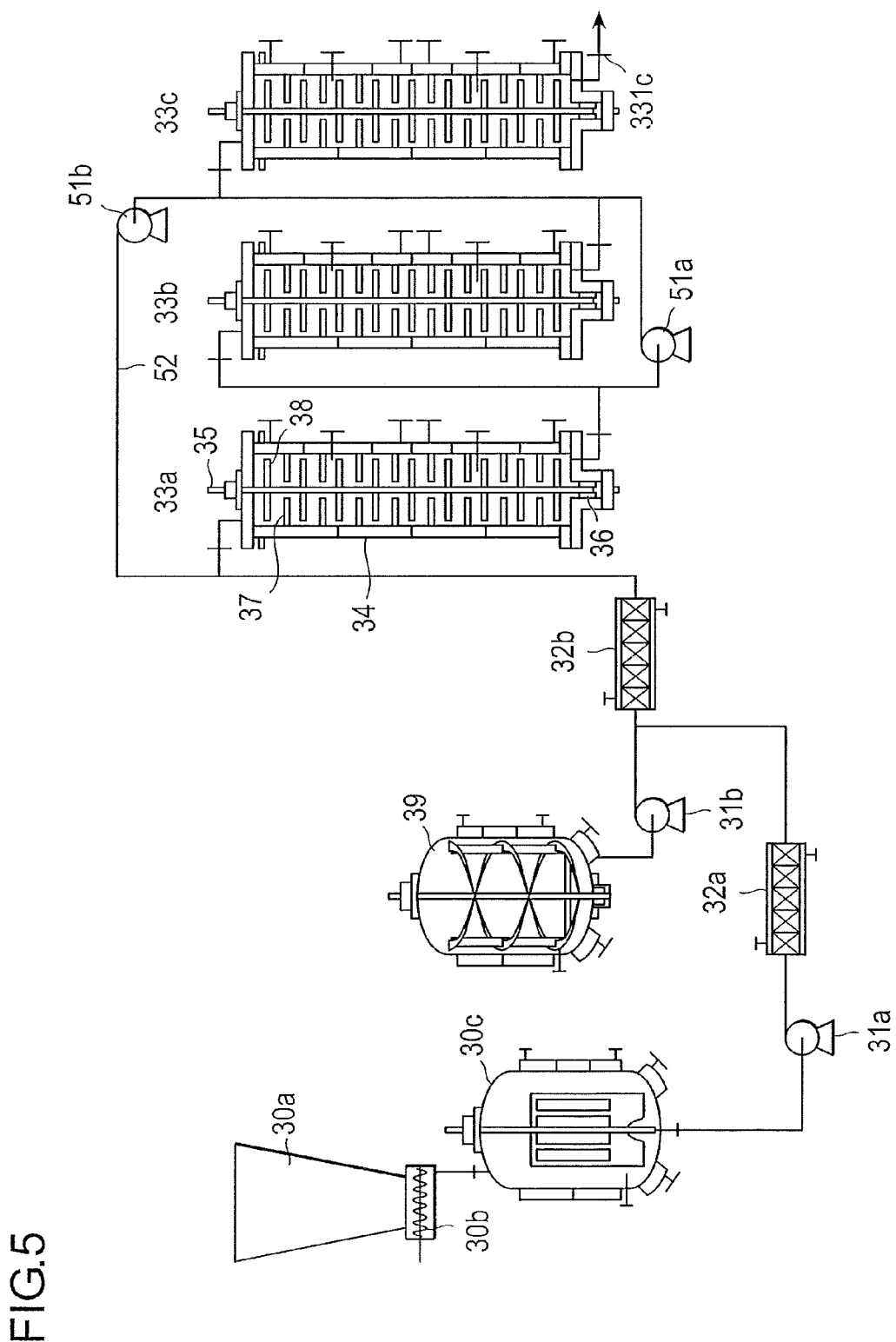
FIG. 5 is a schematic total block diagram showing another example of a production apparatus to be used in the production method of the present invention.

Specifically, a residence time distribution of the reaction mixture can be controlled by supplying at least a part of outlet liquid of the reactor 33b to an inlet of the reactor 33a using, for example, a liquid supplying pump 51b and a pipeline 52 shown in FIG. 5. In the present invention, without limiting to an embodiment of FIG. 5, any embodiments maybe adopted where at least a part of outlet liquid of at least one reactor having plug flow characteristics is supplied to an inlet of at least one reactor having plug flow characteristics. For example, it may be an embodiment where outlet liquid of the reactor 33b of FIG. 5 is supplied to an inlet of the reactor 33a and 33b.

Figure 6:
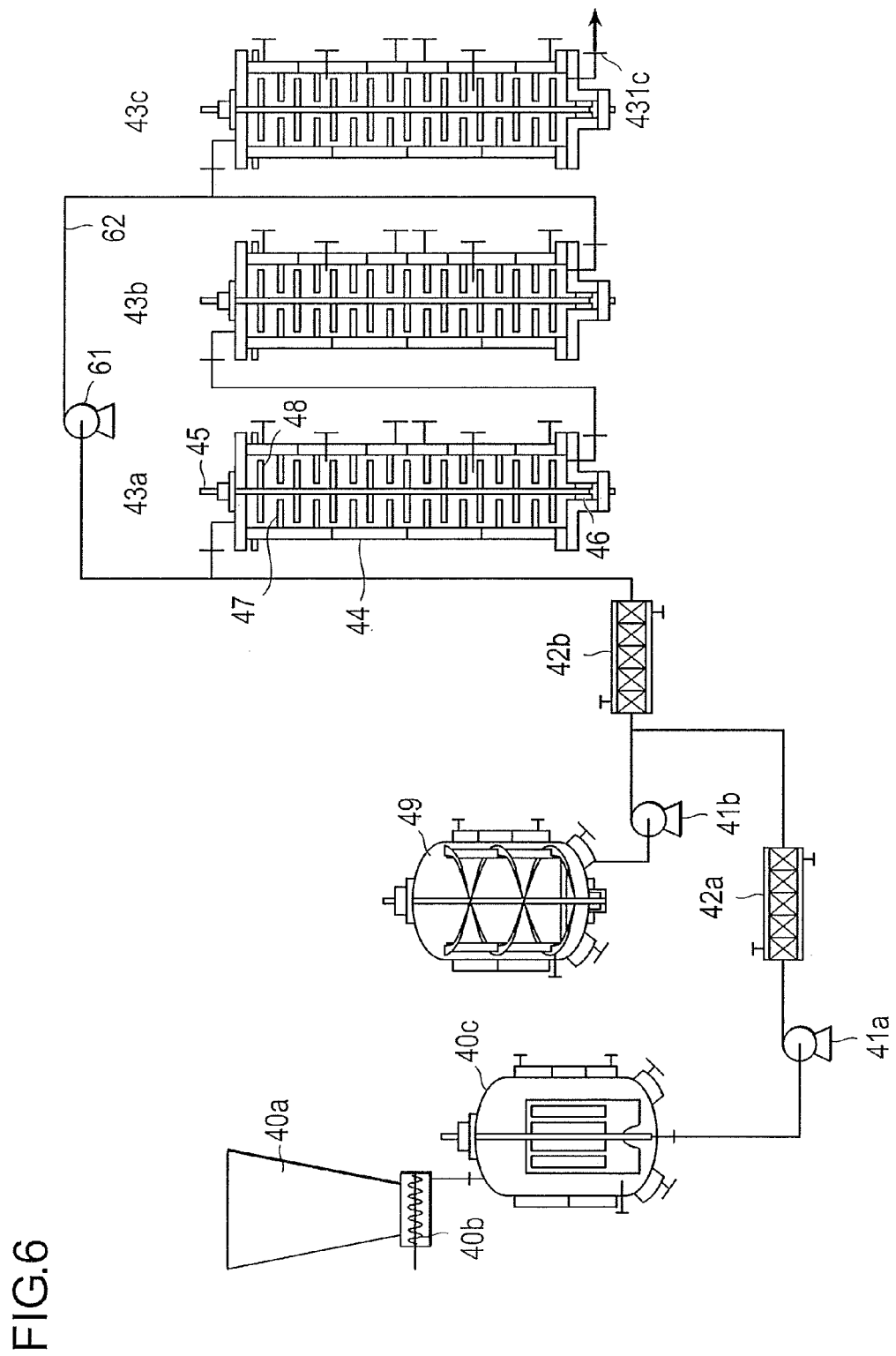
FIG. 6 is a schematic total block diagram showing still another example of a production apparatus to be used in the production method of the present invention.

In addition, a residence time distribution of the reaction mixture may also be controlled, for example, as shown in FIG. 6, by supplying at least a part of inlet liquid of a reactor 43a, to an inlet of a reactor 43c, using a liquid supplying pump 61 and a pipeline 62. In the present invention, without limiting to an embodiment of FIG. 6, any embodiments may be adopted where at least a part of inlet liquid of at least one reactor having plug flow characteristics is supplied to an inlet of at least one reactor having plug flow characteristics at the later stage. For example, it may be an embodiment where outlet liquid of the reactor 43a of FIG. 6 is supplied to an inlet of the reactor 43b and 43c.

Still more, an embodiment where at least a part of outlet liquid of the above at least one reactor having plug flow characteristics is returned to an inlet of at least one reactor having plug flow characteristics, and an embodiment where at least a part of outlet liquid of the above at least one reactor having plug flow characteristics is returned to an inlet of at least one reactor having plug flow characteristics at the later stage may be used in combination.

Polylactic acid obtained by the production method of the present invention may be added with usual additives within a range not to impair characteristics thereof; for example, a plasticizer, an antioxidant, a photostabilizer, an ultraviolet absorber, a heat stabilizer, a lubricant, a mold-releasing agent, various fillers, an antistatic agent, a flame retardant, a foaming agent, an antibacterial•antifungal agent, a nucleating agent, a coloring agent including dye and pigment, may be added, as desired.

Polylactic acid obtained by the production method of the present invention may be molded by a conventionally known method, such as an injection molding, an extrusion molding, a blow molding, a foam molding, a compression molding, or a vacuum molding. As Examples of a molded article obtained by the above molding method, there are included, for example, films, sheets, fibers, clothes, non-woven fabrics, agricultural materials, gardening materials, fishery materials, civil engineering•construction materials, stationeries, medical goods, electric and electronic parts or the like.

EXAMPLES

The present invention will be explained specifically bellow with reference to Examples, however, the present invention should not be limited to these Examples. It should be noted that water content in a reacting system before initiation of a polymerization reaction, weight average molecular weight and molecular weight distribution of the resultant polymer, optical purity of the resultant polymer, conversion rate of lactide, thermal characteristics of the resultant polymer, content ratio of stereo complex crystal of the resultant polymer, and hue of the resultant polymer, shown in each Example, were measured by the following methods.

(1) Water Content Inside a Reaction System

It was measured by Karl-Fischer volumetric titration method. Measurement conditions are shown in the following Table 1.

TABLE 1

| | |
|---|---|
| Measurement instrument: | MKS-510, a Karl-Fischer moisture meter, manufactured by Kyoto Electronics Manufacturing Co., Ltd. |
| Measurement system: | A volumetric titration method |
| Titration solution: | Hydranal Composite 5K |
| Dehydration solvent: | Solvent CE, produced by Hayashi Pure Chemical Ind., Ltd. |
| Measurement method: | 5 g of a sample was weighed accurately, charged in the moisture meter in a state not containing water, dissolved in a dehydration agent by stirring for 5 minutes, then titrated. |

(2) Weight Average Molecular Weight, Number Average Molecular Weight and Molecular Weight Distribution Values converted to polystyrene by a GPC method were measured. Measurement conditions such as measurement instrument are as shown in the following Table 2. Molecular weight distribution was calculated from weight average molecular weight (Mw) and number average molecular weight (Mn) measured, according to the following FORMULA (4).

TABLE 2

| | |
|---|---|
| Detector: | RID-10A (a differential refractometer), manufactured by Shimadzu Corp. |

TABLE 2-continued

| | |
|---|---|
| Pump: | LC-6A, manufactured by Shimadzu Corp. |
| Oven: | CTO-6A, manufactured by Shimadzu Corp. |
| Recording apparatus: | CR-7A, manufactured by Shimadzu Corp. |
| Molecular weight calculation: | a GPC program for CR-7A, manufactured by Shimadzu Corp. |
| Column: | TSKgel-G3000HXL, TSKgel-3000HXL, TSKgel-G4000HXL, TSKgel-G5000HXL, and TSKguardcolumn HXL-L, connected in series, each manufactured by Tosoh Corp. |
| Eluent: | Chloroform (for HPLC, produced by Junsei Chemical Co., Ltd.) |
| Measurement method: | 20 μl of a solution of a sample, dissolved in chloroform in a concentration of 20 mg/ml, was charged under condition of an oven temperature of 40° C., flow rate of the eluent of 1.0 ml/min, and measured. Stereo block polylactic acid was measured under the similar condition as above, by dissolving it in a mixed solvent of chloroform/HFIP = 9/1. |

[FORMULA 4]

$$\text{Molecular weight distribution } (MwD) = \frac{\text{weight average molecular weight}(Mw)}{\text{number average molecular weight}(Mn)} \quad (4)$$

(3) Conversion Rate (Polymerization Rate) of Lactide

% by mass of lactide (LTD) in the resultant polymer was measured using gas chromatograph, and conversion rate (polymerization rate) thereof was calculated according to the following FORMULA (5). Conditions of gas chromatograph are shown in The following Table 3. It should be noted that mol number of lactide in a polymer was obtained by converting % by mass of lactide obtained by measurement, based on mass of a polymer in the case where 100% of the polymer is recovered.

TABLE 3

| | |
|---|---|
| Apparatus: | GC-14B, manufactured by Shimadzu Corp. |
| Detector: | FID |
| Hydrogen pressure: | 60 kPa |
| Air pressure: | 50 kPa |
| Detector temperature: | 200° C. |
| Column oven temperature: | 175° C. |
| Injection temperature: | 200° C. |
| Carrier gas: | Helium |
| Carrier gas flow rate: | 50 ml/min |
| Column: | One prepared by mixing FAL-M10% Shimalite (registered trade mark) TPA60-80 mesh and Tenax (registered trade mark) TA 60-80 mesh, in a volume ratio of 1:1, and filling the mixture into a glass column having an inner diameter of 2.6 mm and a length of 1.5 m |
| Recorder: | CR-7A, manufactured by Shimadzu Corp. |
| Quantitative determination method: | 1 μl of a solution was charged for measurement, which was obtained by dissolving one added with 0.58 g of triethylene glycol, as an inner standard substance, relative to 1 g of a polymer sample, in 25 ml of chloroform. |

[FORMULA 5]

$$\text{Conversion rate (\%)} = \frac{(\text{mol number of LTD before polymerization}) - (\text{mol number of LTD in a polymer})}{(\text{mol number of LTD before polymerization})} \times 100 \quad (5)$$

(4) Thermal Characteristics of the Resultant Polymer

A differential scanning calorimeter (DSC-60, manufactured by Shimadzu Corp.) was used. 10 mg of a sample was put in an aluminum pan, to measure melting temperature of homo crystal (Tmh), heat of fusion of homo crystal (ΔHmh), melting temperature of stereo complex crystal (Tms), and heat of fusion of stereo complex crystal (ΔHms) in nitrogen gas flow of 50 ml/min, under conditions of the following Table 4. Enthalpy of fusion of each crystal was calculated by an area of a region surrounded by crystal melting peak and a baseline appeared in a DSC (differential scanning calorimetry) chart.

TABLE 4

(a) Raise temperature from 30° C. to 250° C. in a rate of 10° C./min
(b) Cool down to 30° C. in a rate of −10° C./min, after reaching 250° C.
(c) Repeat the above (a) and (b) three times
(5) Content rate of stereo complex crystal of the resultant polymer
Content rate of stereo complex crystal was calculated from heat of fusion of homo crystal (ΔHmh) appearing at from 150 to 190° C., and heat of fusion of stereo complex crystal (ΔHms) appearing at from 190 to 250° C., obtained practically from the DSC, according to the following FORMULA (6), assuming heat of fusion of homo crystal (ΔHmh$^0$) of the polylactic acid block copolymer with 100% crystallization to be −203.4 J/g, and heat of fusion of stereo complex crystal (ΔHms$^0$) of the polylactic acid block copolymer with 100% crystallization to be −142 J/g, in the above differential scanning calorimetry.

[FORMULA 6]

$$\text{Content rate of stereo complex crystal(\% by mass)} = \frac{\frac{\Delta Hms}{\Delta Hms^0}}{\frac{\Delta Hmh}{\Delta Hmh^0} + \frac{\Delta Hms}{\Delta Hms^0}} \times 100 \quad (6)$$

(6) Optical Purity

Optical purity was determined from composition ratio of L-lactic acid and D-lactic acid composing polylactic acid. To 0.1 g of a sample, 5 ml of a 5N (5 mol/L) sodium hydroxide solution, and 2.5 mL of isopropanol were added, hydrolyzed under stirring by heating at 30° C., and then neutralized with 1N (0.5 ml/L) sulfuric acid. Concentration was adjusted by dilution of 1 ml of the resultant neutralized solution to 25 times. This solution was charged into a high performance liquid chromatography (HPLC) to calculate peak areas of L-lactic acid and D-lactic acid detected using UV light (a wavelength of 254 nm). Measurement conditions of HLPC are shown in the following Table 5. In addition, optical purity (% ee) was calculated by the following FORMULA (7) from mass ratio of L-lactic [L] (%) and mass ratio of D-lactic [D] (%) calculated from the peak areas.

TABLE 5

| | |
|---|---|
| Pump: | LC-6A, manufactured by Shimadzu Corp. |
| Detector: | SPD-6AV, manufactured by Shimadzu Corp. |
| Oven: | CTO-6A, manufactured by Shimadzu Corp. |
| Recording apparatus: | CR-5A, manufactured by Shimadzu Corp. |
| Column: | SUMICHIRAL OA-5000, manufactured by Sumika Chemical Analysis Service, Ltd. |
| Eluent: | A 1 mmol aqueous solution of copper sulfate |
| Measurement method: | 20 μl of a solution of a sample, dissolved in water in a concentration of 20 mg/ml, was charged under conditions of an oven temperature of 40° C., a wavelength of the detector of 254 nm, and flow rate of the eluent of 1.0 ml/min. |

[FORMULA 7]

$$\text{Optical purity (\% } ee) = 100 \times \frac{|[L] - [D]|}{[L] + [D]} \quad (7)$$

(7) Hue of the Resultant Polymer 1 g of the resultant polymer was dissolved in a 10 ml of a mixed solvent of 1,1,1,3,3,3-hexafluoroisopropanol and chloroform (1:1 volume ratio), which was put in a quartz cell with a light passage of 1 cm, scanned under condition of a view angle of 2 degree, a light source of C, a wavelength range of from 780 to 360 nm, using UV-2550, manufactured by Shimadzu Corp., to calculate yellowness based on JIS Z8730 and JIS K7105, using a color measurement software.

Example 1

Production of poly-L-lactic Acid 600 kg of L-lactide (manufactured by Musashino Chemical Laboratory, Ltd.), 30 g of tin octylate (manufactured by Wako Pure Chemical Industries, Ltd.) and 1500 g of lauryl alcohol (manufactured by Wako Pure Chemical Industries, Ltd.) were charged into a 1000-L pretreatment tank and dried at 40° C., under 1.33×10$^3$ Pa (10 mmHg) for 30 minutes. Then, a depressurized state was released and replaced with nitrogen having a purity of 99.999% by mass. This depressurization operation and nitrogen replacement operation were repeated three times as pretreatment. Water content of L-lactide after the pretreatment was 20 ppm.

Figure 7:
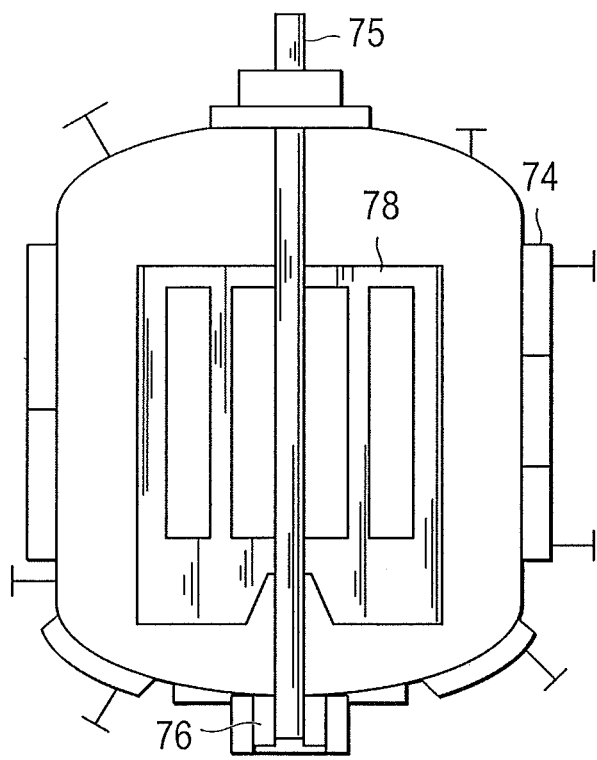
FIG. 7 is a schematic view of a lactide melting tank used in Examples 1 and 2.

Next, into a 15-L lactide melting tank equipped with Max Blend (registered trade name) blade, as shown in FIG. 7, which was blanketed with nitrogen having a purity of 99.999%, in advance, the above L-lactide was supplied in a rate of 11.8 kg/h via a feeder. While melting L-lactide, it was drawn out in a rate of 11.8 kg/h by a molten lactide feed pump, and supplied to a pre-heater. After heating at 200° C. by the pre-heater, it was supplied to the first reactor, to polymerize further in the second reactor and the third reactor. As the first reactor, the second reactor and the third reactor, a 16.8-L reactor having plug flow characteristics with a shape shown in FIG. 2 were used. Each ξ(τ) of the first reactor, the second reactor and the third reactor was 0.28. In addition, ξ(τ) of the whole reaction system was 0.16. It should be noted that temperature of a heating medium circulating in a jacket and a cooling coil was adjusted, so that polymerization temperature of the first reactor, the second reactor and the third reactor attains 200° C. In addition, as the pre-heater, a static mixer provided with a jacket was used, which was heated to desired temperature by adjusting temperature of the heating medium by circulating the heating medium similarly as in the reactor.

Conversion rate (polymerization rate) of lactide of a polymer substance obtained in the third reactor, after reaching a steady state, was 96.5%, Mw was 179,000, Mn was 118,000 and molecular weight distribution was 1.52. In addition, yellowness based on JIS K7105 was 0.65.

Example 2

Synthesis of a Stereo Complex Polylactic Acid Block Copolymer

<Production of poly-D-lactic Acid>

Poly-D-lactic acid was produced similarly as in Example 1, except that D-lactide (manufactured by Musashino Chemical Laboratory, Ltd.) was used instead of L-lactide, and used amount of lauryl alcohol was changed to 5400 g. The 16.8-L reactor having plug flow characteristics with a shape shown in FIG. 2 was used. Each $\xi(\tau)$ of the first reactor, the second reactor and the third reactor was 0.28. In addition, $\xi(\tau)$ of the whole reaction system was 0.16. Poly-D-lactic acid obtained from the third reactor after reaching a steady state was replaced with nitrogen having a purity of 99.999% by mass beforehand, and stored in a polymer melting tank circulating with a heating medium of 200° C. in a jacket. Conversion rate of lactide of the resultant poly-D-lactic acid was 95.9%, Mw was 56,850, Mn was 36,850 and molecular weight distribution was 1.54. In addition, yellowness based on JIS K7105 was 0.64.

<Production of a Stereo Complex Polylactic Acid Block Copolymer>

600 kg of L-lactide (produced by Musashino Chemical Laboratory, Ltd.) and 30 g of tin octylate (produced by Wako Pure Chemical Industries, Ltd.) were charged into a 1000-L pretreatment tank and dried similarly as in Example 1.

Next, into a 15-L melting tank equipped with Max Blend (registered trade name) blade, as shown in FIG. 7, which was blanketed with nitrogen having a purity of 99.999%, the above L-lactide was supplied continuously in a rate of 8.26 kg/h via a feeder. While melting L-lactide, it was supplied to a mixing machine via a pre-heater in a rate of 8.26 kg/h by a molten lactide feed pump during drawing it. It was heated up to 200° C. in the pre-heater. On the other hand, poly-D-lactic acid produced above was supplied to the mixing machine in a rate of 3.54 kg/h from the polymer melting tank; a polymerization solution mixed using the mixing machine was supplied to the first reactor, to polymerize; and still more polymerization was performed in the second reactor and the third reactor. As the mixing machine, the SMX-type static mixer manufactured by SULZER Co., Ltd., was used, and as the first reactor, the second reactor and the third reactor, a 16.8-L reactor having plug flow characteristics with a shape shown in FIG. 2 were used. Each $\xi(\tau)$ of the first reactor, the second reactor and the third reactor was 0.28. In addition, $\xi(\tau)$ of the whole reaction system was 0.16.

It should be noted that temperature of a heating medium circulating in a jacket and a cooling coil was adjusted, so that polymerization temperature of the first reactor, the second reactor and the third reactor attains 200° C. Conversion rate of lactide of a polymer substance obtained in the third reactor, after reaching a steady state, was 96.5%, Mw was 177,900, Mn was 116,000 and molecular weight distribution was 1.53. In addition, melting point of a stereo complex substance, obtained by DSC measurement, was 205° C., and content rate of stereo complex crystal was 100% by mass, and yellowness based on JIS K7105 was 0.68.

Comparative Example 1

Synthesis of poly-L-lactic Acid Using the CSTR-Type Reactor

Figure 8:
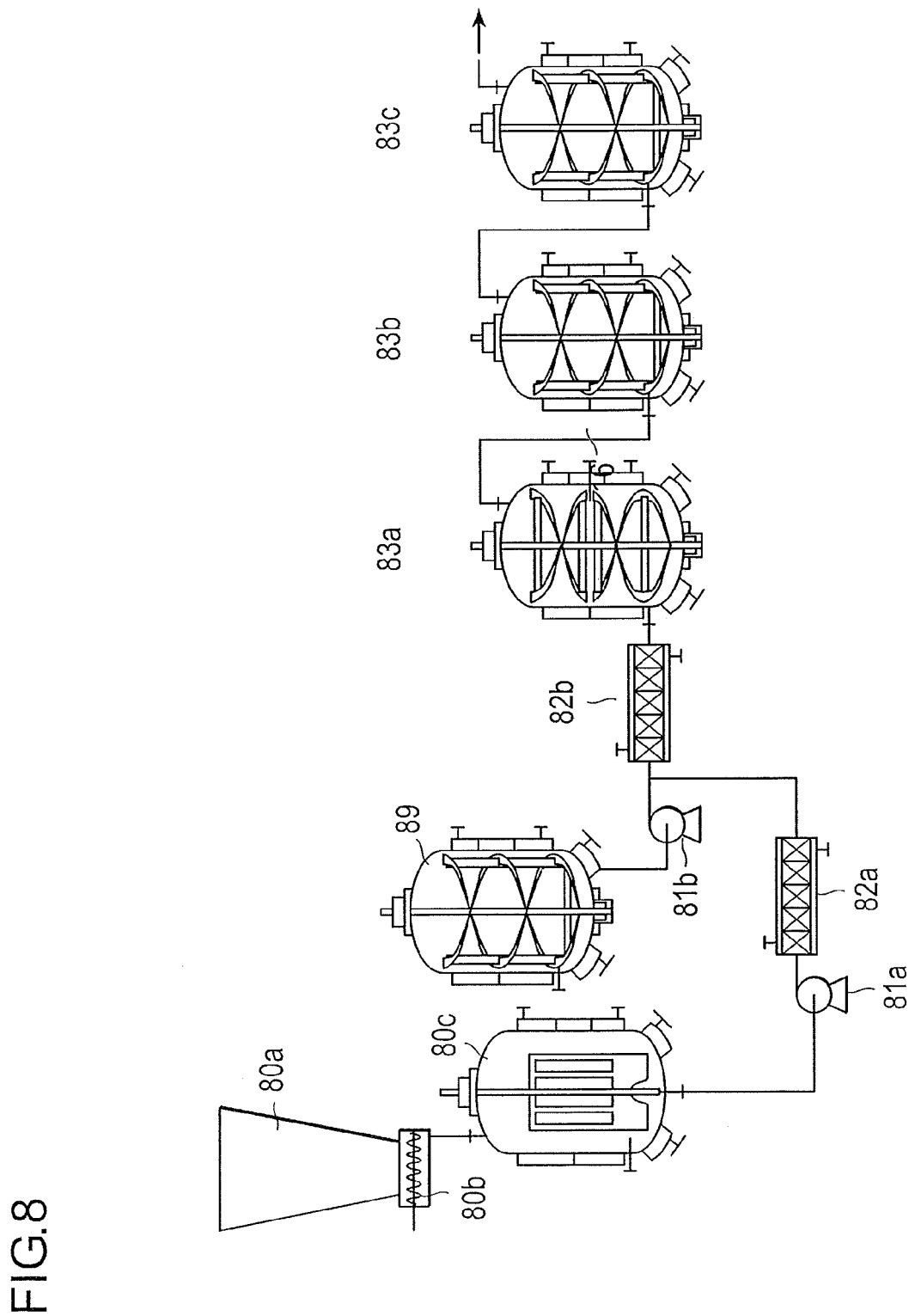
FIG. 8 is a schematic total block diagram showing a production apparatus used in Comparative Examples 1 and 2.

Polymerization of poly-L-lactic acid was performed in a similar apparatus under similar condition as in Example 1, except that three CSTR-type reactors (83a, 83b, 83c) with a capacity of 16.8 L, shown in FIG. 8, were used, instead of the first reactor, the second reactor, and the third reactor, as shown in FIG. 2. As shown in FIG. 8, the first reactor 83a used a stirring blade of a double helical ribbon-type, and the second reactor 83b and the third reactor 83c used a Logborn (registered trade name) blade, manufactured by Kobelco Eco-Solutions Co., Ltd. Each $\xi(\tau)$ of the first reactor, the second reactor and the third reactor was 0.7. In addition, $\xi(\tau)$ of the whole reaction system was 0.41.

Conversion rate of lactide of a polymer substance obtained in the third reactor, after reaching a steady state, was 93.2%, Mw was 163,600, Mn was 99,500 and molecular weight distribution was 1.64. Yellowness measured based on JIS K7105 was 0.71. As compared with example 1, conversion rate of lactide decreased, unevenness was observed in molecular weight, molecular weight distribution was broad and coloring was strong.

Comparative Example 2

Synthesis of Stereo Complex Polylactic Acid Using the CSTR-Type Reactor

<Production of poly-D-lactic Acid>

Polymerization of poly-D-lactic acid was performed in a similar apparatus under similar condition as in Example 2, except that three CSTR-type reactors (83a, 83b, 83c) with a capacity of 16.8 L, and a shape shown in FIG. 8, were used, instead of the first reactor, the second reactor, and the third reactor, as shown in FIG. 2. Each $\xi(\tau)$ of the first reactor, the second reactor and the third reactor was 0.7. $\xi(\tau)$ of the whole reaction system was 0.41. Conversion rate of lactide of a polymer substance obtained in the third reactor 83c, after reaching a steady state, was 93.4%, Mw was 54,850, Mn was 34,250 and molecular weight distribution was 1.60.

<Production of a Stereo Complex Polylactic Acid Block Copolymer>

Polymerization of stereo complex polylactic acid was performed under similar condition as in Example 2, except that three CSTR-type reactors (83a, 83b, 83c) with a capacity of 16.8 L, shown in FIG. 8, were used, instead of the first reactor, the second reactor, and the third reactor, as shown in FIG. 2. Each $\xi(\tau)$ of the first reactor, the second reactor and the third reactor was 0.7. $\xi(\tau)$ of the whole reaction system was 0.41. Conversion rate of lactide of a polymer substance obtained in the third reactor 83c, after reaching a steady state, was 93.2%, Mw was 166,400, Mn was 101,000 and molecular weight distribution was 1.65. In addition, melting point of a stereo complex substance, obtained by DSC measurement, was 198° C., and content rate of stereo complex crystal was 100% by mass. Yellowness measured based on JIS K7105 was 0.73. As compared with example 2, conversion rate of lactide decreased, unevenness was observed in molecular weight, molecular weight distribution was broad, melting point of the resultant stereo complex substance was low, and coloring was strong.

Results of the Examples 1 and 2, along with Comparative Examples 1 and 2 are summarized in the following Tables 6 to 8. It should be noted that Table 6 is an analysis result of the polymers obtained in Example 1 and Comparative Example 1; Table 7 is an analysis result of the polymers obtained in Example 2 and Comparative Example 2; and Table 8 is an analysis result of thermal characteristics of the polymers obtained in Example 2 and Comparative Example 2.

TABLE 6

|  | Conversion rate of lactide (%) | Mw | Mn | Mw/Mn | Optical purity (% ee) | Yellowness |
| --- | --- | --- | --- | --- | --- | --- |
| Example 1 | 96.5 | 179,000 | 118,000 | 1.52 | 99.7 | 0.65 |
| Comparative Example 1 | 93.2 | 163,600 | 99,500 | 1.64 | 99.3 | 0.71 |

TABLE 7

|  | After the first stage polymerization | | | | | After the second stage polymerization | | | | |
| --- | --- | --- | --- | --- | --- | --- | --- | --- | --- | --- |
|  | Conversion rate of lactide (%) | Mw | Mn | Mw/Mn | Optical purity (% ee) | Conversion rate of lactide (%) | Mw | Mn | Mw/Mn | Yellowness |
| Example 2 | 96.3 | 56,850 | 36,850 | 1.54 | 99.6 | 96.5 | 177,900 | 116,000 | 1.53 | 0.68 |
| Comparative Example 2 | 93.4 | 54,500 | 33,000 | 1.65 | 99.2 | 93.2 | 166,400 | 101,000 | 1.65 | 0.73 |

TABLE 8

|  | ΔHmh (J/g) | ΔHms (J/g) | Tmh (° C.) | Tms (° C.) | Content rate of stereo complex crystal (%) |
| --- | --- | --- | --- | --- | --- |
| Example 2 | n.d. | 35.2 | n.d. | 205.3 | 100 |
| Comparative Example 2 | 2.4 | 28.4 | 175.6 | 198.4 | 92.2 |

(Note)
n.d.: Not detected

It should be noted that the present application is based on Japanese Patent Application No. 2009-146825, filed on Jun. 19, 2009, the content of which is hereby incorporated by reference in its entirety into this application.

Description of Reference Numerals 10a, 30a, 40a, 80a Lactide pretreatment tank,
10b, 30b, 40b, 80b Feeder,
10c, 30c, 40c, 80c Lactide melting tank,
11a, 11b, 31a, 31b, 41a, 41b, 51a, 51b, 61 Liquid supplying pump,
12a, 32a, 42a, 82a Heat exchanger,
12b, 32b, 42b, 82b Mixing machine,
13a, 33a, 43a, 83a First reactor,
13b, 33b, 43b, 83b Second reactor,
13c, 33c, 43c, 83c Third reactor,
14, 34, 44, 74 Jacket,
15, 35, 45, 75 Rotating axis,
16, 36, 46, 76 Bearing,
17, 37, 47 Cooling tube group,
18, 38, 48 Stirring blade,
19, 39, 49, 89 Polymer melting tank,
52, 62 Pipeline,
78 Max Blend (registered trade name) blade,
131c, 331c, 431c Reactor outlet.

The invention claimed is:

1. A method for producing polylactic acid comprising the steps of:
providing at least one reactor having plug flow characteristics with $\xi(\tau)$, calculated from the following FORMULA (1), of 0.3 or smaller:

$$\xi(\tau) = \int_0^\infty (E(\tau) \times ABS(1-\tau)) d\tau \quad \text{[FORMULA 1]}$$

in the FORMULA 1, $\xi(\tau)$ is a residence time distribution function determined by impulse response by starch syrup having a viscosity of 3 Pa·s, and $\tau$ is ratio of elapsed time $\theta$ and mean residence time $\theta_0$; and polymerizing molten lactide in the reactor or reactors.

2. The method for producing polylactic acid according to claim 1, further comprising the step of preliminary polymerizing the molten lactide in a complete mixing tank-type reactor at stage before the reactor having plug flow characteristics.

3. The method for producing polylactic acid according to claim 1, further comprising the step of melting of lactide using an apparatus blanketed with inert gas with a purity of 99.9% by mass or higher to obtain the molten lactide.

4. The method for producing polylactic acid according to claim 3, wherein melting temperature of the lactide is 120° C. or lower, and melting time is 2 hours or shorter.

5. The method for producing polylactic acid according to claim 1, wherein final conversion rate of the molten lactide, is higher than 93.4%.

6. The method for producing polylactic acid according to claim 1, wherein a stabilizer is further added to the obtained polylactic acid which includes unreacted molten lactide.

7. The method for producing polylactic acid according to claim 1, wherein the reactor having plug flow characteristics comprises:
a long cylindrical container in a flow direction;
one stage or multiple stages of stirring blades extending in a vertical direction relative to a stirrer axis; and
a cooling tube provided inside the container.

8. The method for producing polylactic acid according to claim 1, wherein the reactor having plug flow characteristics comprises:
a long cylindrical container in a flow direction; and
a static mixer element provided inside the container.

9. The method for producing polylactic acid according to claim 8, wherein the static mixer element has function to remove heat of reaction by flowing a cooling medium inside.

10. The method for producing polylactic acid according to claim 1, using at least two reactors having plug flow characteristics,
wherein at least a part of outlet liquid of at least one reactor having the plug flow characteristics is supplied back to an inlet of the same reactor having the plug flow characteristics or supplied to an inlet of a different reactor having the plug flow characteristics.

11. The method for producing polylactic acid according to claim 1, using at least two reactors having the plug flow characteristics,
wherein inlet liquid is divided into two parts and one part is supplied to one reactor having the plug flow characteristics and the second part is supplied to an inlet of a different reactor having plug flow characteristics.

12. The method for producing polylactic acid according to claim 1, further comprising charging a lactide in a lactide pretreatment tank before the lactide is melted, dried under reduced pressure until water content of the dried lactide is 50 ppm or lower by repeating operations of depressurization and pressurization with inert gas having a purity of preferably 99.9% by mass or higher so that oxygen concentration is 0.1% by mass or lower.

* * * * *